(12) United States Patent
Wu et al.

(10) Patent No.: US 12,362,787 B2
(45) Date of Patent: Jul. 15, 2025

(54) AUXILIARY INFORMATION TRANSMISSION METHOD, TERMINAL DEVICE, AND NETWORK DEVICE

(71) Applicant: VIVO MOBILE COMMUNICATION CO., LTD., Guangdong (CN)

(72) Inventors: Kai Wu, Guangdong (CN); Na Li, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 190 days.

(21) Appl. No.: 18/100,756

(22) Filed: Jan. 24, 2023

(65) Prior Publication Data
US 2023/0163814 A1    May 25, 2023

Related U.S. Application Data

(63) Continuation of application No. PCT/CN2021/108572, filed on Jul. 27, 2021.

(30) Foreign Application Priority Data

Jul. 29, 2020    (CN) .......................... 202010746030.2

(51) Int. Cl.
*H04B 7/0417*    (2017.01)
*H04L 5/00*    (2006.01)
(Continued)

(52) U.S. Cl.
CPC ......... *H04B 7/0417* (2013.01); *H04L 5/0048* (2013.01); *H04L 5/0055* (2013.01); *H04W 28/0221* (2013.01); *H04W 72/54* (2023.01)

(58) Field of Classification Search
CPC . H04W 74/00; H04W 74/08; H04W 74/0833; H04W 74/0836; H04W 74/0838;
(Continued)

(56) References Cited

U.S. PATENT DOCUMENTS 11,497,026 B2 * 11/2022 MolavianJazi ...... H04B 17/318
2007/0280236 A1 * 12/2007 Yang ..................... H04L 12/185
370/432

(Continued)

FOREIGN PATENT DOCUMENTS

CN    101047607 A    10/2007
CN    111278091 A    6/2020
(Continued)

OTHER PUBLICATIONS

Extended European Search Report for Application No. 21851349.7, dated Dec. 19, 2023, 17 Pages.
(Continued)

*Primary Examiner* — James M Perez
(74) *Attorney, Agent, or Firm* — BROOKS KUSHMAN P.C.

(57) ABSTRACT

An auxiliary information transmission method, a terminal device, and a network device. The method includes: transmitting auxiliary information by using a target message, where the target message includes an MSG-3 message or an MSG-A message, and the auxiliary information includes at least one of the following content: a power compensation value expected by the terminal device, a bandwidth capability, a modulation scheme supported by the terminal device, a maximum MIMO layer supported by the terminal device, a quantity of receive antennas of the terminal device, an RRM measurement report, a target serving cell, an expected PDCCH aggregation level, expected times of repetition transmission, and a transmit power capability.

18 Claims, 4 Drawing Sheets

(51) Int. Cl.
*H04W 28/02* (2009.01)
*H04W 72/54* (2023.01)

(58) Field of Classification Search
CPC ......... H04W 74/0866; H04W 74/0883; H04W 74/0891; H04W 72/50; H04W 72/54; H04W 28/0215; H04W 28/0221; H04B 7/04; H04B 7/0413; H04B 7/0417; H04L 5/003; H04L 5/0048; H04L 5/0053; H04L 5/0055

See application file for complete search history.

(56) References Cited

U.S. PATENT DOCUMENTS

| | | | | |
|---|---|---|---|---|
| 2013/0242832 | A1* | 9/2013 | Koc | H04W 16/04 370/311 |
| 2019/0037425 | A1* | 1/2019 | Hong | H04W 72/23 |
| 2019/0342874 | A1* | 11/2019 | Davydov | H04W 72/23 |
| 2020/0029283 | A1* | 1/2020 | Lei | H04W 24/08 |
| 2021/0076384 | A1* | 3/2021 | MolavianJazi | H04W 74/0833 |
| 2021/0105851 | A1* | 4/2021 | Kim | H04W 74/08 |
| 2021/0120581 | A1* | 4/2021 | Kim | H04W 76/27 |
| 2021/0168862 | A1* | 6/2021 | Murray | H04W 74/0816 |
| 2021/0195654 | A1* | 6/2021 | Lei | H04B 17/26 |
| 2021/0227451 | A1* | 7/2021 | Babaei | H04W 76/27 |
| 2021/0227587 | A1* | 7/2021 | Tsai | H04W 76/27 |
| 2021/0250153 | A1* | 8/2021 | Lin | H04W 72/23 |
| 2021/0250989 | A1* | 8/2021 | Chin | H04W 80/02 |
| 2021/0329508 | A1* | 10/2021 | Gopal | H04L 5/001 |
| 2021/0329701 | A1* | 10/2021 | Lei | H04W 74/0833 |
| 2021/0352712 | A1* | 11/2021 | Ly | H04W 76/11 |
| 2021/0360544 | A1* | 11/2021 | Chen | H04W 8/24 |
| 2021/0360660 | A1* | 11/2021 | Cozzo | H04L 1/1887 |
| 2022/0095136 | A1* | 3/2022 | Beale | H04L 1/0039 |
| 2022/0095389 | A1* | 3/2022 | Chen | H04W 74/0841 |
| 2022/0174723 | A1* | 6/2022 | Wei | H04W 74/0833 |
| 2022/0210806 | A1* | 6/2022 | Rastegardoost | H04W 74/0833 |
| 2022/0225220 | A1* | 7/2022 | Vos | H04W 48/02 |
| 2022/0248469 | A1* | 8/2022 | Cao | H04W 74/0833 |
| 2022/0264589 | A1* | 8/2022 | Sun | H04W 74/0833 |
| 2022/0377800 | A1* | 11/2022 | Chin | H04W 74/0833 |
| 2023/0038753 | A1* | 2/2023 | Tan | H04W 74/0841 |
| 2023/0135408 | A1* | 5/2023 | Guo | H04W 52/325 370/329 |
| 2023/0140213 | A1* | 5/2023 | Awadin | H04L 5/0044 370/329 |
| 2023/0163814 | A1* | 5/2023 | Wu | H04W 52/54 375/262 |
| 2023/0247682 | A1* | 8/2023 | Wei | H04W 74/006 |
| 2023/0254075 | A1* | 8/2023 | Cozzo | H04L 5/001 |
| 2023/0276227 | A1* | 8/2023 | Jin | H04W 8/24 370/328 |
| 2023/0284264 | A1* | 9/2023 | Kim | H04L 1/0003 370/329 |
| 2023/0292373 | A1* | 9/2023 | Chang | H04W 24/10 |
| 2023/0328575 | A1* | 10/2023 | Jung | H04W 28/0215 370/230 |
| 2024/0032103 | A1* | 1/2024 | Rastegardoost | H04W 74/0833 |
| 2024/0073960 | A1* | 2/2024 | Hossain | H04W 74/0833 |
| 2024/0080174 | A1* | 3/2024 | Wang | H04W 8/22 |
| 2024/0187967 | A1* | 6/2024 | He | H04W 72/51 |
| 2024/0196442 | A1* | 6/2024 | Yan | H04B 17/328 |
| 2024/0215015 | A1* | 6/2024 | Su | H04W 72/569 |
| 2024/0237078 | A1* | 7/2024 | Cozzo | H04L 1/0003 |
| 2024/0244703 | A1* | 7/2024 | Tseng | H04B 17/328 |
| 2024/0284511 | A1* | 8/2024 | MolavianJazi | H04L 1/08 |
| 2024/0298356 | A1* | 9/2024 | Yang | H04W 74/0833 |
| 2024/0324027 | A1* | 9/2024 | Sedin | H04W 74/0836 |
| 2024/0365398 | A1* | 10/2024 | Mo | H04W 74/0833 |

FOREIGN PATENT DOCUMENTS

| | | |
|---|---|---|
| EP | 3920600 A1 | 12/2021 |
| JP | 2023512969 A | 3/2023 |
| WO | 2021147580 A1 | 7/2021 |

OTHER PUBLICATIONS

Samsung "Considerations on access barring and UE capability" 3GPP TSG RAN WG1 #101, e-Meeting, May 2020, R1-2003913, 2 Pages.

National Instruments "Considerations on the Random-Access Procedure in Massive MIMO NR" 3GPP TSG-RAN WG2 NR Ad Hoc, Spokane, USA, Jan. 2017, R2-1700103.

First Office Action for Japanese Application No. 2023-505450, dated Dec. 28, 2023, 4 Pages.

Huawei "Other aspects for reduced capability devices" 3GPP TSG RAN WG1 Meeting #101-e, E-meeting, May 2020, R1-2004612, 6 Pages.

* cited by examiner

Transmit auxiliary information by using a target message

Determine, based on a first condition, whether to transmit auxiliary information by using a target message

S302

Transmit the auxiliary information by using the target message

Transmit auxiliary information by using a target message in a case that a target preamble is used

Receive auxiliary information by using a target message

Transmission module

Receiving module

AUXILIARY INFORMATION TRANSMISSION METHOD, TERMINAL DEVICE, AND NETWORK DEVICE

CROSS-REFERENCE TO RELATED APPLICATIONS

This application is a continuation of PCT International Application No. PCT/CN2021/108572 filed on Jul. 27, 2021, which claims priority to Chinese Patent Application No. 202010746030.2, filed on Jul. 29, 2020, which are incorporated herein by reference in their entireties.

TECHNICAL FIELD

Embodiments of the present disclosure relate to the communication field, and in particular, to an auxiliary information transmission method, a terminal device, and a network device.

BACKGROUND

In New Radio (New Radio, NR), after entering a radio resource control (Radio Resource Control, RRC) connected state, user equipment (User Equipment, UE) can report auxiliary information such as a UE capability. Therefore, a network device can obtain the auxiliary information only in the connected state, and performs configuration or scheduling based on the auxiliary information. In this case, the network device cannot obtain the auxiliary information before the connected state, and cannot properly configure or schedule the UE before the connected state. Therefore, transmission performance is affected.

SUMMARY

According to a first aspect, an auxiliary information transmission method is provided. The method is performed by a terminal device, and the method includes: transmitting auxiliary information by using a target message, where the target message includes an MSG-3 message or an MSG-A message, and the auxiliary information includes at least one of the following content: a power compensation value expected by the terminal device, a bandwidth capability, a modulation scheme supported by the terminal device, a maximum MIMO layer supported by the terminal device, a quantity of receive antennas of the terminal device, an RRM measurement report, a target serving cell, an expected PDCCH aggregation level, expected times of repetition transmission, and a transmit power capability.

According to a second aspect, an auxiliary information transmission method is provided. The method is performed by a network device, and the method includes: receiving auxiliary information by using a target message, where the target message includes an MSG-3 message or an MSG-A message, and the auxiliary information includes at least one of the following content: a power compensation value expected by the terminal device, a bandwidth capability, a modulation scheme supported by the terminal device, a maximum MIMO layer supported by the terminal device, a quantity of receive antennas of the terminal device, an RRM measurement report, a target serving cell, an expected PDCCH aggregation level, expected times of repetition transmission, and a transmit power capability.

According to a third aspect, an auxiliary information transmission apparatus is provided, including: a transmission module, configured to transmit auxiliary information by using a target message, where the target message includes an MSG-3 message or an MSG-A message, and the auxiliary information includes at least one of the following content: a power compensation value expected by the terminal device, a bandwidth capability, a modulation scheme supported by the terminal device, a maximum MIMO layer supported by the terminal device, a quantity of receive antennas of the terminal device, an RRM measurement report, a target serving cell, an expected PDCCH aggregation level, expected times of repetition transmission, and a transmit power capability.

According to a fourth aspect, an auxiliary information transmission apparatus is provided, including: a receiving module, configured to receive auxiliary information by using a target message, where the target message includes an MSG-3 message or an MSG-A message, and the auxiliary information includes at least one of the following content: a power compensation value expected by the terminal device, a bandwidth capability, a modulation scheme supported by the terminal device, a maximum MIMO layer supported by the terminal device, a quantity of receive antennas of the terminal device, an RRM measurement report, a target serving cell, an expected PDCCH aggregation level, expected times of repetition transmission, and a transmit power capability.

According to a fifth aspect, a terminal device is provided. The terminal device includes a processor, a memory, and a program or an instruction that is stored in the memory and that can run on the processor, and when the program or the instruction is executed by the processor, steps in the method described in the first aspect are implemented.

According to a sixth aspect, a network device is provided. The network device includes a processor, a memory, and a program or an instruction that is stored in the memory and that can run on the processor, and when the program or the instruction is executed by the processor, steps in the method described in the second aspect are implemented.

According to a seventh aspect, a readable storage medium is provided, where the readable storage medium stores a program or an instruction, and when the program or the instruction is executed by a processor, steps in the method described in the first aspect or the second aspect are implemented.

According to an eighth aspect, a computer program product is provided, where the program product is stored in a non-volatile storage medium, and the program is executed by at least one processor to implement steps in the method described in the first aspect or the second aspect.

According to a ninth aspect, an embodiment of this application provides a chip, where the chip includes a processor and a communication interface, the communication interface is coupled to the processor, and the processor is configured to run a program or an instruction to implement the method described in the first aspect or the second aspect.

BRIEF DESCRIPTION OF DRAWINGS

The accompanying drawings described herein are used to provide further understanding of this application and constitute a part of this application. The exemplary embodiments of this application and descriptions thereof are used to explain this application, and do not constitute an undue limitation on this application. In the accompanying drawings.

DETAILED DESCRIPTION

The following clearly describes the technical solutions in the embodiments of this application with reference to the accompanying drawings in the embodiments of this application. Apparently, the described embodiments are some rather than all of the embodiments of this application. Based on the embodiments of this application, all other embodiments obtained by a person of ordinary skill in the art without creative efforts shall fall within the protection scope of this application.

Terms "first" and "second" in the specification and claims of this application are used to distinguish between similar objects, and do not need to be used to describe a specific order or sequence. It should be understood that data used in this way may be interchangeable in appropriate cases, so that the embodiments of this application can be implemented in a sequence other than those shown or described herein. In addition, in the specification and the claims, "and/or" represents at least one of connected objects, and the character "/" generally represents an "or" relationship between associated objects.

It should be noted that the technology described in the embodiments of this application is not limited to a Long Term Evolution (Long Time Evolution, LTE)/LTE-advanced (LTE-Advanced, LTE-A) system, and may also be used in various wireless communication systems, for example, Code Division Multiple Access (Code Division Multiple Access, CDMA), Time Division Multiple Access (Time Division Multiple Access, TDMA), Frequency Division Multiple Access (Frequency Division Multiple Access, FDMA), Orthogonal Frequency Division Multiple Access (Orthogonal Frequency Division Multiple Access, OFDMA), Single-carrier Frequency-Division Multiple Access (Single-carrier Frequency-Division Multiple Access, SC-FDMA), and another system. The terms "system" and "network" in the embodiments of this application are often used interchangeably. The described technology may be used in the foregoing system and radio technology, and may also be used in another system and radio technology. However, a New Radio (New Radio, NR) system is described below as an example, and the term NR is used in most of the descriptions, although these technologies can also be used in an application other than an application of the NR system, for example, a sixth ($6^{th}$ Generation, 6G) communication system.

Figure 1:
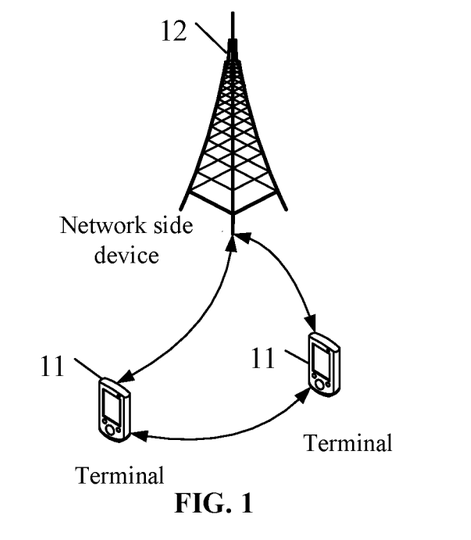
FIG. 1 is a block diagram of a wireless communication system to which an embodiment of the present disclosure is applicable.

FIG. 1 is a block diagram of a wireless communication system to which an embodiment of this application is applicable. The wireless communication system includes a terminal 11 and a network side device 12. The terminal 11 may also be referred to as a terminal device or user equipment (User Equipment, UE). The terminal 11 may be a terminal side device such as a mobile phone, a tablet personal computer (Tablet Personal Computer), a laptop computer (Laptop Computer) or a notebook computer, a personal digital assistant (Personal Digital Assistant, PDA), a palmtop computer, a netbook, an ultra-mobile personal computer (ultra-mobile personal computer, UMPC), a mobile Internet device (Mobile Internet Device, MID), a wearable device (Wearable Device) or a vehicle-mounted device (VUE), or a pedestrian terminal (PUE). The wearable device includes a band, a headset, eyeglasses, or the like. It should be noted that a specific type of the terminal 11 is not limited in this embodiment of this application. The network side device 12 may be a base station or a core network. The base station may be referred to as a NodeB, an evolved Node B, an access point, a base transceiver station (Base Transceiver Station, BTS), a radio base station, a radio transceiver, a basic service set (Basic Service Set, BSS), an extended service set (Extended Service Set, ESS), a NodeB, an evolved NodeB (eNB), a home NodeB, a home evolved NodeB, a WLAN access point, a WiFi node, a transmitting receiving point (Transmitting Receiving Point, TRP), or another suitable term in the field provided that a same technical effect is achieved. The base station is not limited to a specific technical term. It should be noted that, in this application, only a base station in an NR system is used as an example, but a specific type of the base station is not limited.

An auxiliary information method provided in embodiments of this application is described in detail below with reference to the accompanying drawings by using specific embodiments and application scenarios thereof.

Figure 2:
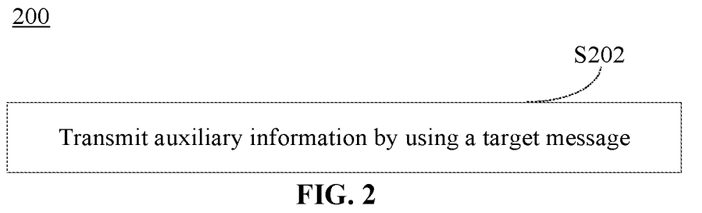
FIG. 2 is a schematic flowchart of an auxiliary information transmission method according to an embodiment of the present disclosure.

As shown in FIG. 2, an embodiment of the present disclosure provides an auxiliary information transmission method 200. The method may be performed by a terminal device. In other words, the method may be performed by software or hardware installed in the terminal device. The method includes the following steps:

S202: Transmit auxiliary information by using a target message.

The target message includes an MSG-3 message or an MSG-A message.

A random access (Random Access Channel, RACH) process may be implemented in two manners: a four-step RACH process and a two-step RACH process.

In an implementation, in the four-step RACH process, UE first sends a first message (msg1) of the RACH process to a network, including a random access preamble (preamble). After detecting the preamble, the network sends a second message (msg2), including a random access response (Random Access Response, RAR) corresponding to the preamble. After receiving the msg2, the UE sends a third message (msg3) of the RACH process according to an instruction of the RAR. After receiving the msg3, the network sends a fourth message (msg4), including a contention resolution ID (contention resolution ID). The UE receives the msg4. In this way, four-step random access is completed. In the case of the four-step RACH process, the target message is an MSG-3 message of the RACH process.

In another implementation, in the two-step RACH process, the UE first sends the MSG-A, where the MSG-A includes two parts: a physical random access channel (Physical Random Access Channel, PRACH) preamble and a physical uplink shared channel (Physical Uplink Shared Channel, PUSCH). Transmission information of the PUSCH may include UE-ID information. After receiving the MSG-A sent by the UE, the network sends an MSG-B to the UE. A physical downlink shared channel (Physical downlink shared channel PDSCH, PDSCH) scheduled by a physical downlink control channel (Physical downlink control channel, PDCCH) scrambled by the network by using an MSGB-radio network temporary identifier (MSGB-Radio Network Temporary Identifier, MSGB-RNTI) may include the UE-ID. After the UE detects the UE-ID sent in the MSG-A, it may be considered that contention resolution succeeds, and an MSG-B hybrid automatic repeat request acknowledgement (Hybrid automatic repeat request acknowledgement, HARQ-ACK) is fed back to the network. In the case of the two-step RACH process, the target message is an MSG-A message.

The auxiliary information includes at least one of the following content: a power compensation value expected by the terminal device, a bandwidth capability, a modulation scheme supported by the terminal device, a maximum multiple input multiple output layer (Multiple Input Multiple Output layer, MIMO layer) of the terminal device, a quantity of receive antennas of the terminal device, a radio resource management (Radio resource management, RRM) measurement report, a target serving cell, an expected PDCCH aggregation level, expected times of repetition transmission, and a transmit power capability.

Reduced capability UE (Reduced capability UEs, RedCap UE) is used as an example for description. Because the UE supports a relatively small quantity of receive antennas, or has a relatively low antenna gain, or supports relatively narrow bandwidth, the network device may transmit the auxiliary information before the RRC connection is established by using the foregoing target information, to identify the RedCap UE, or obtain auxiliary information reported by the RedCap UE, so as to perform specific configuration or scheduling for the RedCap UE, thereby improving transmission performance.

According to the auxiliary information transmission method provided in this embodiment of the present disclosure, auxiliary information is transmitted by using a target message, where the target message includes an MSG-3 message or an MSG-A message, and the auxiliary information includes at least one of the following content: a power compensation value expected by the terminal device, a bandwidth capability, a modulation scheme supported by the terminal device, a maximum MIMO layer supported by the terminal device, a quantity of receive antennas of the terminal device, an RRM measurement report, a target serving cell, an expected PDCCH aggregation level, expected times of repetition transmission, and a transmit power capability. The terminal device can report the auxiliary information of the terminal device before establishing the RRC connection, so that the network device can perform targeted configuration or scheduling on the terminal device, thereby improving transmission performance.

Figure 3:
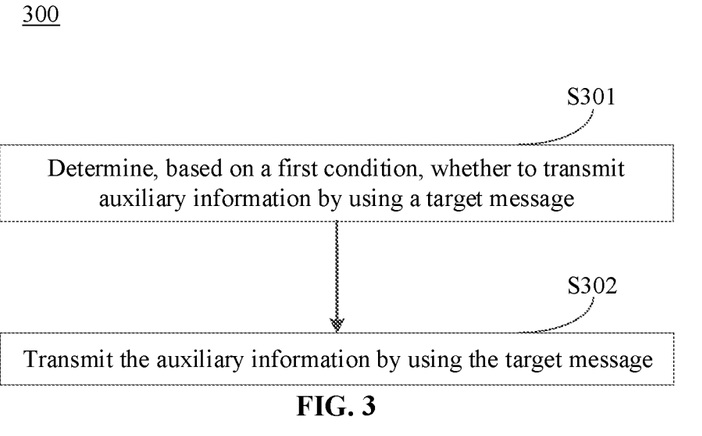
FIG. 3 is a schematic flowchart of an auxiliary information transmission method according to an embodiment of the present disclosure.

As shown in FIG. 3, an embodiment of the present disclosure provides an auxiliary information transmission method 300. The method may be performed by a terminal device. In other words, the method may be performed by software or hardware installed in the terminal device. The method includes the following steps:

S301: Determine, based on a first condition, whether to transmit auxiliary information by using a target message.

The first condition includes at least one of the following:
whether the auxiliary information is transmitted by using the target message is configured by a network;
it is determined by a type of the terminal device that the auxiliary information is transmitted by using the target message;
measurement information measured by the terminal device is higher than or lower than a preset threshold, where the measurement information includes at least one of an RSRP, an RSRQ, or a path loss value; and
in a case that the target message includes MSG-A, a TBS or a bit rate of the MSG-A is less than or equal to a preset value.

In an implementation, whether to transmit the auxiliary information by using the target message may be determined by using network configuration. If the auxiliary information is transmitted by using the target message in the network configuration, the auxiliary information is transmitted by using the target message; otherwise, the auxiliary information is not transmitted by using the target message.

In another implementation, whether to transmit the auxiliary information by using the target message may be determined by using a type of the terminal device.

In still another implementation, whether to transmit the auxiliary information by using the target message may be determined by using a preset condition, and the preset condition includes at least one of the following conditions:

Condition 1: Reference signal received power (Reference Signal Received Power, RSRP), reference signal received quality (Reference Signal Received Quality, RSRQ), or a path loss measured by the terminal device is higher than or lower than a preset threshold.

Condition 2: In a case that the target message includes MSG-A, a transport block size (Transport Block Size, TBS) or a bit rate of the MSG-A is less than or equal to a preset value. Alternatively, it is determined according to a modulation and coding scheme (Modulation and coding scheme, MCS) level configured by the network. If an MCS index is less than or equal to the preset value, the MSG-A may be used to transmit the target information.

In an implementation, in a case that the target message is an MSG-3 message, whether to transmit the auxiliary information by using the MSG-3 message is indicated by using an RAR or indicated by using a PDCCH scrambled by a transmission configuration RNTI (Transmission Configuration-RNTI, TC-RNTI).

S302: Transmit the auxiliary information by using the target message.

This step is performed in a case that it is determined to transmit the auxiliary information by using the target message in the foregoing step. For details, same or similar descriptions of step S202 in the embodiment in FIG. 2 may be used. For a repetition part, details are not described herein again.

In another implementation, the target message includes an identifier for reporting the auxiliary information. The identifier may be a preset bit combination, or may be a logical channel ID.

In an implementation, the terminal device is in an idle state or a non-active state.

According to the auxiliary information transmission method provided in this embodiment of the present disclosure, auxiliary information is transmitted by using a target message, where the target message includes an MSG-3 message or an MSG-A message, and the auxiliary information includes at least one of the following content: a power compensation value expected by the terminal device, a bandwidth capability, a modulation scheme supported by the terminal device, a maximum MIMO layer supported by the terminal device, a quantity of receive antennas of the terminal device, an RRM measurement report, a target serving cell, an expected PDCCH aggregation level, expected times of repetition transmission, and a transmit power capability. The terminal device can report the auxiliary information of the terminal device before establishing the RRC connection, so that the network device can perform targeted configuration or scheduling on the terminal device, thereby improving transmission performance.

Figure 4:
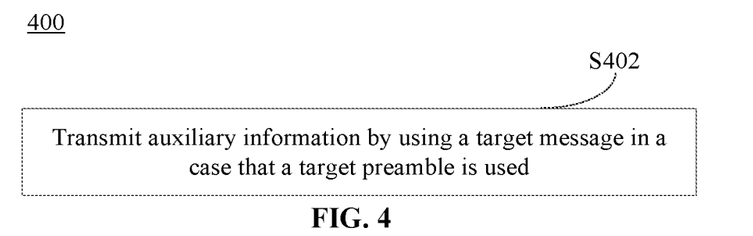
FIG. 4 is a schematic flowchart of an auxiliary information transmission method according to an embodiment of the present disclosure.

As shown in FIG. 4, an embodiment of the present disclosure provides an auxiliary information transmission method 400. The method may be performed by a terminal device. In other words, the method may be performed by software or hardware installed in the terminal device. The method includes the following steps:

S402: Transmit auxiliary information by using a target message in a case that a target preamble is used.

This step may be described by using the same or similar descriptions in step S202 in the embodiment shown in FIG. 2 and step S302 in the embodiment shown in FIG. 3. Repeated parts are not described herein again.

In an implementation, the target preamble is indicated by a network.

In an implementation, an RO resource of each SSB or CSI-RS corresponds to a different target preamble. In an implementation, a set of preamble indexes associated with each SSB or CSI-RS may be different. For example, a cell has four SSBs or CSI-RS, and associated preamble indexes are SSB #0→0-16; SSB #1→17-32; SSB #3→33-48; SSB #4→49-64. For SSB #0, SSB #0→0-X-1 is a preamble index indicating that the auxiliary information is not transmitted by using the target message, SSB #0→X-Y is a preamble index indicating that the auxiliary information is transmitted by using the target message, and X<Y≤16. In another implementation, different preamble indexes are used to correspond to different sets of auxiliary information reporting amounts, for example, a first preamble set corresponds to reporting of a first information combination, and a second preamble set corresponds to reporting of a second information combination.

In another implementation, an RO resource of each SSB or CSI-RS may alternatively correspond to a same target preamble.

According to the auxiliary information transmission method provided in this embodiment of the present disclosure, auxiliary information is transmitted by using a target message, where the target message includes an MSG-3 message or an MSG-A message, and the auxiliary information includes at least one of the following content: a power compensation value expected by the terminal device, a bandwidth capability, a modulation scheme supported by the terminal device, a maximum MIMO layer supported by the terminal device, a quantity of receive antennas of the terminal device, an RRM measurement report, a target serving cell, an expected PDCCH aggregation level, expected times of repetition transmission, and a transmit power capability. The terminal device can report the auxiliary information of the terminal device before establishing the RRC connection, so that the network device can perform targeted configuration or scheduling on the terminal device, thereby improving transmission performance.

The auxiliary information transmission method according to embodiments of the present disclosure is described above with reference to FIG. 2 to FIG. 4. An auxiliary information transmission method according to another embodiment of the present disclosure is described below with reference to FIG. 5. It may be understood that interaction between a network device and a terminal device described from a network device side is the same as that described on a terminal device side in the methods shown in FIG. 2 to FIG. 4. To avoid repetition, related descriptions are appropriately omitted.

Figure 5:
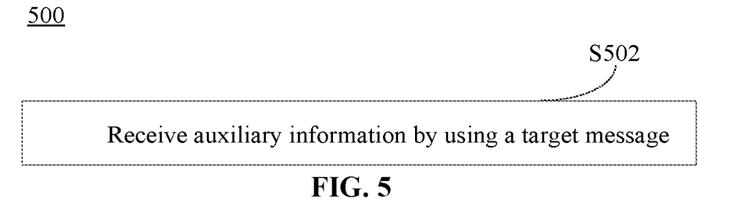
FIG. 5 is a schematic flowchart of an auxiliary information transmission method according to an embodiment of the present disclosure.

FIG. 5 is a schematic flowchart of implementing an auxiliary information transmission method according to an embodiment of the present disclosure, and the method may be applied to a network device side. As shown in FIG. 5, the method 500 includes:

S502: Receive auxiliary information by using a target message.

The target message includes an MSG-3 message or an MSG-A message, and the auxiliary information includes at least one of the following content: a power compensation value expected by the terminal device, a bandwidth capability, a modulation scheme supported by the terminal device, a maximum MIMO layer supported by the terminal device, a quantity of receive antennas of the terminal device, an RRM measurement report, a target serving cell, an expected PDCCH aggregation level, expected times of repetition transmission, and a transmit power capability.

In an implementation, the target message includes an identifier for reporting the auxiliary information.

In an implementation, the receiving auxiliary information by using a target message includes: receiving the auxiliary information by using the target message in a case that a target preamble is detected.

In an implementation, the target preamble is indicated by a network.

Specific execution steps of the foregoing implementations are similar to those described in the embodiments shown in FIG. 2 to FIG. 4, and are not described again.

It should be noted that, the auxiliary information transmission method provided in this embodiment of this application may be performed by an auxiliary information transmission apparatus, or a control module in the apparatus that is configured to load the foregoing method. In this embodiment of this application, an example in which the auxiliary information transmission apparatus performs the auxiliary information transmission method is used to describe the auxiliary information transmission method provided in this embodiment of this application.

Figure 6:
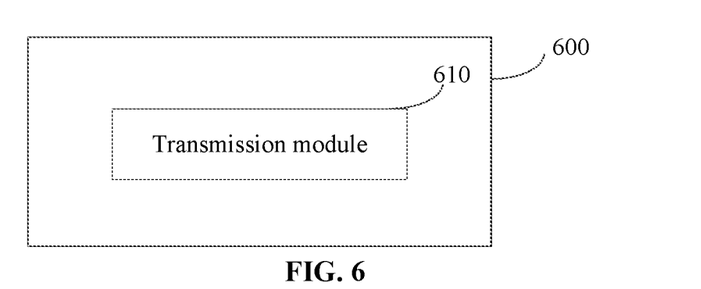
FIG. 6 is a schematic diagram of a structure of a terminal device according to an embodiment of the present disclosure.

FIG. 6 is a schematic diagram of a structure of an auxiliary information transmission method according to an embodiment of the present disclosure. As shown in FIG. 6, the auxiliary information transmission method 600 includes a transmission module 610.

The transmission module 610 is configured to transmit auxiliary information by using a target message, where the target message includes an MSG-3 message or an MSG-A message, and the auxiliary information includes at least one of the following content: a power compensation value expected by the terminal device, a bandwidth capability, a modulation scheme supported by the terminal device, a maximum MIMO layer supported by the terminal device, a quantity of receive antennas of the terminal device, an RRM measurement report, a target serving cell, an expected PDCCH aggregation level, expected times of repetition transmission, and a transmit power capability.

In an implementation, the transmission module 610 is configured to determine, based on a first condition, whether to transmit the auxiliary information by using the target message, where the first condition includes at least one of the following conditions:

Whether the auxiliary information is transmitted by using the target message is configured by a network; it is determined by a type of the terminal device that the auxiliary information is transmitted by using the target message; measurement information measured by the terminal device is higher than or lower than a preset threshold, where the measurement information includes at least one of an RSRP, an RSRQ, or a path loss value; and in a case that the target message includes MSG-A, a TBS or a bit rate of the MSG-A is less than or equal to a preset value.

In an implementation, in a case that the target message is an MSG-3 message, whether to transmit the auxiliary information by using the MSG-3 message is indicated by using an RAR or indicated by using a PDCCH scrambled by a TC-RNTI.

In an implementation, the target message includes an identifier for reporting the auxiliary information.

In an implementation, the transmission module 610 is configured to transmit the auxiliary information by using the target message when a target preamble is used.

In an implementation, the target preamble is indicated by a network.

In an implementation, an RO resource of each SSB or CSI-RS corresponds to a different target preamble.

In an implementation, the apparatus is applied to a terminal device, and the terminal device is in an idle state or an inactive state.

The auxiliary information transmission apparatus in this embodiment of this application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a notebook computer, a palmtop computer, an in-vehicle terminal device, a wearable device, an ultra-mobile personal computer (ultra-mobile personal computer, UMPC), a netbook, or a personal digital assistant (personal digital assistant, PDA), and the non-mobile electronic device may be a server, a network attached storage (Network Attached Storage, NAS), a personal computer (personal computer, PC), a television (television, TV), a counter, or a self-service machine. This is not specifically limited in this embodiment of this application.

The auxiliary information transmission apparatus in this embodiment of this application may be an apparatus with an operating system. The operating system may be an Android (Android) operating system, may be an iOS operating system, or may be another possible operating system. This is not specifically limited in this embodiment of this application.

For the apparatus 600 in this embodiment of the present disclosure, reference may be made to a procedure corresponding to FIG. 2 to FIG. 4 in embodiments of the present disclosure. In addition, units/modules in the apparatus 600 and other operations and/or functions are respectively used to implement corresponding procedures in FIG. 2 to FIG. 4, and a same or equivalent technical effect can be achieved. For brevity, details are not described herein again.

Figure 7:
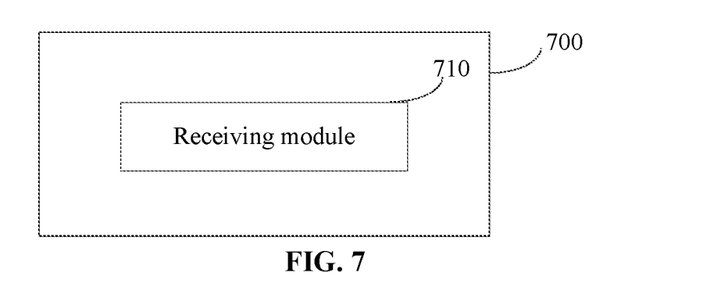
FIG. 7 is a schematic diagram of a structure of a network device according to an embodiment of the present disclosure.

FIG. 7 is a schematic diagram of a structure of an auxiliary information transmission method according to an embodiment of the present disclosure. As shown in FIG. 7, the auxiliary information transmission method 700 includes a receiving module 710.

The receiving module 710 is configured to receive auxiliary information by using a target message, where the target message includes an MSG-3 message or an MSG-A message, and the auxiliary information includes at least one of the following content: a power compensation value expected by the terminal device, a bandwidth capability, a modulation scheme supported by the terminal device, a maximum MIMO layer supported by the terminal device, a quantity of receive antennas of the terminal device, an RRM measurement report, a target serving cell, an expected PDCCH aggregation level, expected times of repetition transmission, and a transmit power capability.

In an implementation, the target message includes an identifier for reporting the auxiliary information.

In an implementation, the receiving module 710 is configured to receive the auxiliary information by using the target message when a target preamble is used.

In an implementation, the target preamble is indicated by a network. The auxiliary information transmission apparatus in this embodiment of this application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a notebook computer, a palmtop computer, an in-vehicle terminal device, a wearable device, an ultra-mobile personal computer (ultra-mobile personal computer, UMPC), a netbook, or a personal digital assistant (personal digital assistant, PDA), and the non-mobile electronic device may be a server, a network attached storage (Network Attached Storage, NAS), a personal computer (personal computer, PC), a television (television, TV), a counter, or a self-service machine. This is not specifically limited in this embodiment of this application.

The auxiliary information transmission apparatus in this embodiment of this application may be an apparatus with an operating system. The operating system may be an Android (Android) operating system, may be an iOS operating system, or may be another possible operating system. This is not specifically limited in this embodiment of this application.

For the apparatus 700 in this embodiment of the present disclosure, reference may be made to a procedure corresponding to method 500 in embodiments of the present disclosure. In addition, units/modules in the apparatus 700 and other operations and/or functions are respectively used to implement corresponding procedures in the method 500, and a same or equivalent technical effect can be achieved. For brevity, details are not described herein again.

Figure 8:
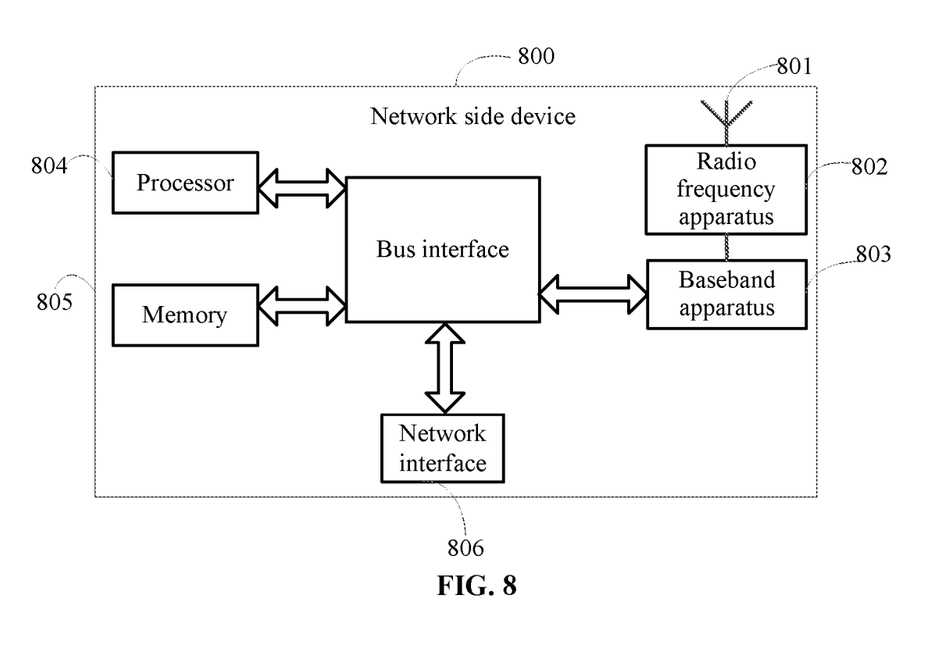
FIG. 8 is a schematic diagram of a structure of a network device according to another embodiment of the present disclosure.

Specifically, an embodiment of this application further provides a network side device. As shown in FIG. 8, the network device 800 includes an antenna 801, a radio frequency apparatus 802, and a baseband apparatus 803. The antenna 801 is connected to the radio frequency apparatus 802. In an uplink direction, the radio frequency apparatus 802 receives information by using the antenna 801, and sends the received information to the baseband apparatus 803 for processing. In a downlink direction, the baseband apparatus 803 processes to-be-sent information, and sends the to-be-sent information to the radio frequency apparatus 802. After processing the received information, the radio frequency apparatus 802 sends the information by using the antenna 801.

The foregoing band processing apparatus may be located in the baseband apparatus 803. In the foregoing embodiment, a method performed by the network side device may be implemented in the baseband apparatus 803. The baseband apparatus 803 includes a processor 804 and a memory 805.

For example, the baseband apparatus 803 may include at least one baseband board. Multiple chips are disposed on the baseband board. As shown in FIG. 8, one chip is, for example, the processor 804, and is connected to the memory 805, to invoke a program in the memory 805 to perform an operation of the network side device shown in the foregoing method embodiment.

The baseband apparatus 803 may further include a network interface 806, configured to exchange information with the radio frequency apparatus 802, where the interface is, for example, a common public radio interface (common public radio interface, CPRI for short).

Specifically, the network side device in this embodiment of the present disclosure further includes an instruction or a program that is stored in the memory 805 and that can run on the processor 804. The processor 804 invokes the instruction or the program in the memory 805 to perform the following: receiving auxiliary information by using a target message, where the target message includes an MSG-3 message or an MSG-A message, and the auxiliary information includes at least one of the following content: a power compensation value expected by the terminal device, a bandwidth capability, a modulation scheme supported by the terminal device, a maximum MIMO layer supported by the terminal device, a quantity of receive antennas of the terminal device, an RRM measurement report, a target serving cell, an expected PDCCH aggregation level, expected times of repetition transmission, and a transmit power capability.

In an implementation, the target message includes an identifier for reporting the auxiliary information.

In an implementation, the receiving auxiliary information by using a target message includes: receiving the auxiliary information by using the target message in a case that a target preamble is detected.

In an implementation, the target preamble is indicated by a network.

A specific execution process is described in the embodiment in FIG. 5, and a same technical effect is achieved. To avoid repetition, details are not described herein again.

Figure 9:
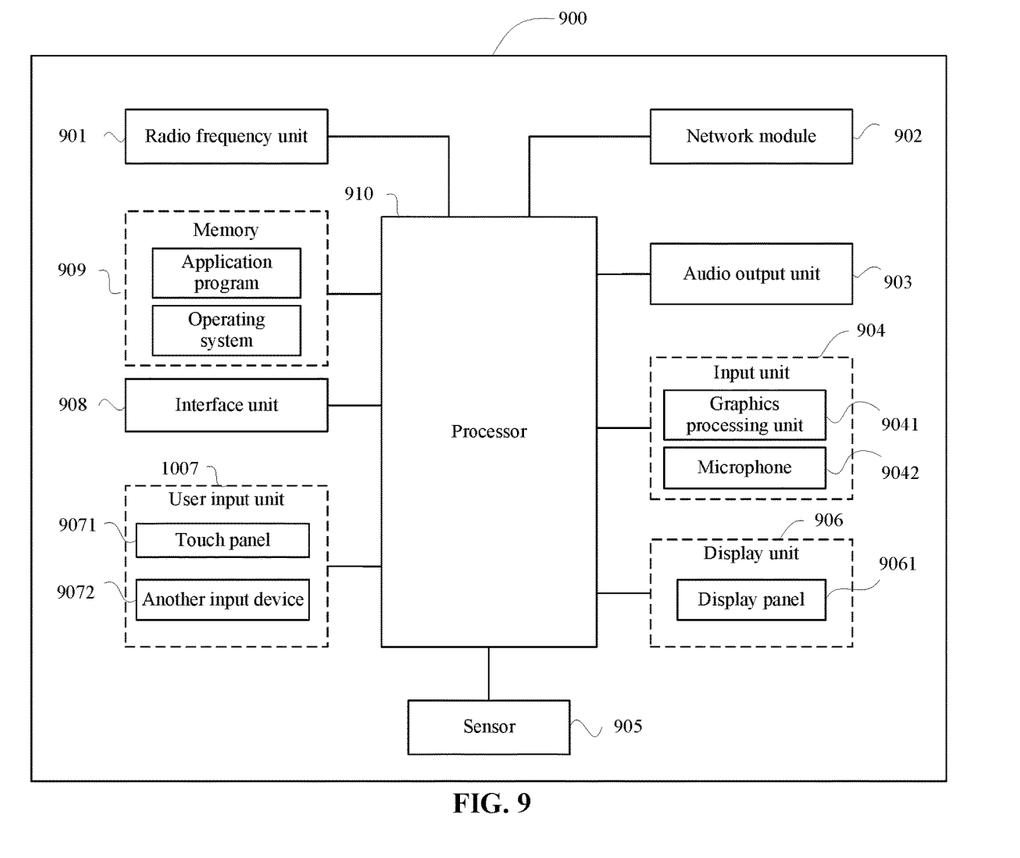
FIG. 9 is a schematic diagram of a structure of a terminal device according to another embodiment of the present disclosure.

FIG. 9 is a schematic diagram of a hardware structure of a terminal device according to an embodiment of this application.

The terminal device 900 includes but is not limited to components such as a radio frequency unit 901, a network module 902, an audio output unit 903, an input unit 904, a sensor 905, a display unit 906, a user input unit 907, an interface unit 908, a memory 909, and a processor 910.

It may be understood by a person skilled in the art that the terminal device 900 may further include a power supply (such as a battery) that supplies power to each component. The power supply may be logically connected to the processor 910 by using a power management system, to implement functions such as charging, discharging, and power consumption management by using the power management system. A structure of the terminal device shown in FIG. 9 does not constitute a limitation on the terminal device, and the terminal device may include more or fewer parts than those shown in the figure, or combine some components, or have different part arrangements. Details are not described herein again.

It should be understood that, in this embodiment of this application, the input unit 904 may include a graphics processing unit (Graphics Processing Unit, GPU) 9041 and a microphone 9042. The graphics processing unit 9041 processes image data of a static picture or a video obtained by an image capture apparatus (such as a camera) in a video capture mode or an image capture mode. The display unit 906 may include a display panel 9061, and the display panel 9061 may be configured in a form of a liquid crystal display, an organic light emitting diode, or the like. The user input unit 907 includes a touch panel 9071 and another input device 9072. The touch panel 9071 is also referred to as a touchscreen. The touch panel 9071 may include two parts: a touch detection apparatus and a touch controller. The another input device 9072 may include but is not limited to one or more of a physical keyboard, a function key (such as a volume control key or an on/off key), a trackball, a mouse, a joystick, and the like. Details are not described herein.

In this embodiment of this application, after receiving downlink data from a network side device, the radio frequency unit 901 sends the downlink data to the processor 910 for processing, and sends uplink data to the network side device. Generally, the radio frequency unit 901 includes but is not limited to an antenna, at least one amplifier, a transceiver, a coupler, a low noise amplifier, a duplexer, and the like.

The memory 909 may be configured to store a software program or an instruction and various data. The memory 909 may mainly include a storage program or instruction area and a storage data area, where the storage program or instruction area may store an operating system, an application program or an instruction required by at least one function (such as a sound play function or an image play function), and the like. In addition, the memory 909 may include a high-speed random access memory, and may further include a non-volatile memory. The non-volatile memory may be a read-only memory (Read-only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory, for example, at least one magnetic disk storage device, a flash memory device, or another non-volatile solid-state storage device.

The processor 910 may include one or more processing units. Optionally, the processor 910 may be integrated with an application processor and a modem processor. The application processor mainly processes an operating system, a user interface, an application program or an instruction, and the like, and the modem processor mainly processes wireless communication, for example, a baseband processor. It may be understood that the modem processor may also not be integrated into the processor 910.

The processor 910 is configured to transmit auxiliary information by using a target message, where the target message includes an MSG-3 message or an MSG-A message, and the auxiliary information includes at least one of the following content: a power compensation value expected by the terminal device, a bandwidth capability, a modulation scheme supported by the terminal device, a maximum MIMO layer supported by the terminal device, a quantity of receive antennas of the terminal device, an RRM measurement report, a target serving cell, an expected PDCCH aggregation level, expected times of repetition transmission, and a transmit power capability.

In an implementation, the processor 910 is configured to determine, based on a first condition, whether to transmit the auxiliary information by using the target message, where the first condition includes at least one of the following conditions: Whether the auxiliary information is transmitted by using the target message is configured by a network; it is determined by a type of the terminal device that the auxiliary information is transmitted by using the target message; measurement information measured by the terminal device is higher than or lower than a preset threshold, where the measurement information includes at least one of an RSRP, an RSRQ, or a path loss value; and in a case that the target message includes MSG-A, a TBS or a bit rate of the MSG-A is less than or equal to a preset value.

In an implementation, in a case that the target message is an MSG-3 message, whether to transmit the auxiliary information by using the MSG-3 message is indicated by using an RAR or indicated by using a PDCCH scrambled by a TC-RNTI.

In an implementation, the target message includes an identifier for reporting the auxiliary information.

In an implementation, the transmitting auxiliary information by using a target message includes: transmitting the auxiliary information by using the target message in a case that a target preamble is used.

In an implementation, the target preamble is indicated by a network.

In an implementation, an RO resource of each SSB or CSI-RS corresponds to a different target preamble.

In an implementation, the terminal device is in an idle state or a non-active state.

For the terminal device 900 in this embodiment of the present disclosure, reference may be made to a procedure corresponding to the methods 200 to 400 in the embodiments of the present disclosure. In addition, units/modules in the terminal device 900 and other operations and/or functions are respectively used to implement corresponding procedures in the methods 200 to 400, and a same or equivalent technical effect can be achieved. For brevity, details are not described herein again.

An embodiment of this application further provides a readable storage medium. A program or an instruction is stored in the readable storage medium. When the program or the instruction is executed by a processor, the processes of the embodiments of the foregoing auxiliary information transmission method can be implemented, and a same technical effect can be achieved. To avoid repetition, details are not described herein.

The processor is a processor in the electronic device in the foregoing embodiment. The readable storage medium includes a computer-readable storage medium such as a read-only memory (Read-Only Memory, ROM), a random access memory (Random Access Memory, RAM), a magnetic disk, an optical disc, or the like.

An embodiment of this application further provides a computer program product. The program product is stored in a non-volatile storage medium, and the program is executed by at least one processor to implement processes of the foregoing auxiliary information transmission method, and a same technical effect can be achieved. To avoid repetition, details are not described herein again.

An embodiment of this application further provides a chip. The chip includes a processor and a communications interface, the communications interface is coupled to the processor, and the processor is configured to run a program or an instruction to implement the processes of the foregoing embodiments of the auxiliary information transmission method, and a same technical effect can be achieved. To avoid repetition, details are not described herein again.

According to the auxiliary information transmission method, the terminal device, and the network device provided in the embodiments of the present disclosure, auxiliary information is transmitted by using a target message, where the target message includes an MSG-3 message or an MSG-A message, and the auxiliary information includes at least one of the following content: a power compensation value expected by the terminal device, a bandwidth capability, a modulation scheme supported by the terminal device, a maximum MIMO layer supported by the terminal device, a quantity of receive antennas of the terminal device, an RRM measurement report, a target serving cell, an expected PDCCH aggregation level, expected times of repetition transmission, and a transmit power capability. In this way, the auxiliary information can be obtained before a connected state to properly configure or schedule UE before the connected state, thereby improving transmission performance.

It should be understood that the chip mentioned in this embodiment of this application may also be referred to as a system-level chip, a system chip, a chip system, or a system on a chip.

It should be noted that in this specification, the term "include", "including", or any other variant is intended to cover non-exclusive inclusion, so that a process, method, article, or apparatus that includes a series of elements includes not only those elements but also other elements that are not explicitly listed, or includes elements inherent to such a process, method, article, or apparatus. In the absence of more restrictions, an element defined by the statement "including a . . . " does not exclude another same element in a process, method, article, or apparatus that includes the element. In addition, it should be noted that a scope of the method and the apparatus in the embodiments of this application is not limited to: performing a function in a sequence shown or discussed, and may further include: performing a function in a basically simultaneous manner or in a reverse sequence based on an involved function. For example, the described method may be performed in a different order, and various steps may be added, omitted, or combined. In addition, features described with reference to some examples may be combined in other examples.

According to the descriptions of the foregoing implementations, a person skilled in the art may clearly understand that the foregoing method embodiments may be implemented by using software and a required universal hardware platform, or certainly may be implemented by using hardware. However, in many cases, the former is a better implementation. Based on such an understanding, the technical solutions of this application essentially or the part contributing to existing technologies may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, or a network device) to execute the methods described in the embodiments of this application.

The embodiments of this application are described with reference to the accompanying drawings. However, this application is not limited to the foregoing specific implementations. The foregoing specific implementations are merely examples, but are not limiting. A person of ordinary skill in the art may make many forms without departing from the objective and the scope of the claims of this application, and these forms all fall within the protection scope of this application.

The invention claimed is:

1. An auxiliary information transmission method, performed by a terminal device, and comprising:
   transmitting auxiliary information by using a target message, to identify a Reduced Capability (RedCap) UE, wherein the target message comprises an MSG-3 message or an MSG-A message, and the auxiliary information comprises:
   a bandwidth capability and a maximum MIMO supported by the terminal device;
   wherein the target message comprises an identifier for reporting the auxiliary information, and the identifier is a logical channel ID;
   wherein the auxiliary information further comprises: a modulation scheme supported by the terminal device.

2. The method according to claim 1, wherein before the transmitting auxiliary information by using a target message, the method further comprises:
   determining, based on a first condition, whether to transmit the auxiliary information by using the target message, wherein the first condition comprises at least one of the following conditions:
   whether the auxiliary information is transmitted by using the target message is configured by a network;
   it is determined by a type of the terminal device that the auxiliary information is transmitted by using the target message;
   measurement information measured by the terminal device is higher than or lower than a preset threshold, wherein the measurement information comprises at least one of an RSRP, an RSRQ, or a path loss value; or,
   in a case that the target message includes MSG-A, a TBS or a bit rate of the MSG-A is less than or equal to a preset value.

3. The method according to claim 1, wherein in a case that the target message is an MSG-3 message, whether to transmit the auxiliary information by using the MSG-3 message is indicated by using an RAR or indicated by using a PDCCH scrambled by a TC-RNTI.

4. The method according to claim 1, wherein the transmitting auxiliary information by using a target message comprises:
   transmitting the auxiliary information by using the target message in a case that a target preamble is used.

5. The method according to claim 4, wherein the target preamble is indicated by a network.

6. The method according to claim 4, wherein an RO resource of each SSB or CSI-RS corresponds to a different target preamble.

7. The method according to claim 1, wherein the terminal device is in an idle state or an inactive state.

8. An auxiliary information transmission method, performed by a network device, and comprising:
   receiving auxiliary information by using a target message, to identify a Reduced Capability (RedCap) UE, wherein the target message comprises an MSG-3 message or an MSG-A message, and the auxiliary information comprises:
   a bandwidth capability and a maximum MIMO layer supported by the terminal device;
   wherein the target message comprises an identifier for reporting the auxiliary information, and the identifier is a logical channel ID;
   wherein the auxiliary information further comprises: a modulation scheme supported by the terminal device.

9. The method according to claim 8, wherein the receiving auxiliary information by using a target message comprises:
   receiving the auxiliary information by using the target message in a case that a target preamble is detected.

10. The method according to claim 9, wherein the target preamble is indicated by a network.

11. A network device, comprising: a processor, a memory, and a program or an instruction that is stored in the memory and that can run on the processor, wherein when the program or the instruction is executed by the processor, steps in the auxiliary information transmission method according to claim 8 are implemented.

12. The network device according to claim 11, wherein the receiving auxiliary information by using a target message comprises: receiving the auxiliary information by using the target message in a case that a target preamble is detected.

13. A terminal device, comprising: a processor, a memory, and a program or an instruction that is stored in the memory and that can run on the processor, wherein when the program or the instruction is executed by the processor, the following steps are implemented:
   transmitting auxiliary information by using a target message, to identify a Reduced Capability (RedCap) UE, wherein the target message comprises an MSG-3 message or an MSG-A message, and the auxiliary information comprises:
   a bandwidth capability and a maximum MIMO supported by the terminal device;
   wherein the target message comprises an identifier for reporting the auxiliary information, and the identifier is a logical channel ID;
   wherein the auxiliary information further comprises: a modulation scheme supported by the terminal device.

14. The terminal device according to claim 13, wherein when the program or the instruction is executed by the processor, the following step is further implemented:
   before the transmitting auxiliary information by using a target message, determining, based on a first condition, whether to transmit the auxiliary information by using the target message, wherein the first condition comprises at least one of the following conditions:
   whether the auxiliary information is transmitted by using the target message is configured by a network;
   it is determined by a type of the terminal device that the auxiliary information is transmitted by using the target message;
   measurement information measured by the terminal device is higher than or lower than a preset threshold, wherein the measurement information comprises at least one of an RSRP, an RSRQ, or a path loss value; or,
   in a case that the target message includes MSG-A, a TBS or a bit rate of the MSG-A is less than or equal to a preset value.

15. The terminal device according to claim 13, wherein:
   in a case that the target message is an MSG-3 message, whether to transmit the auxiliary information by using the MSG-3 message is indicated by using an RAR or indicated by using a PDCCH scrambled by a TC-RNTI.

16. The terminal device according to claim 13, wherein the transmitting auxiliary information by using a target message comprises:
   transmitting the auxiliary information by using the target message in a case that a target preamble is used.

17. The terminal device according to claim 16, wherein the target preamble is indicated by a network, or an RO resource of each SSB or CSI-RS corresponds to a different target preamble.

18. The terminal device according to claim 13, wherein the terminal device is in an idle state or an inactive state.

* * * * *